(12) United States Patent
Kreuzer et al.

(10) Patent No.: US 11,597,503 B2
(45) Date of Patent: Mar. 7, 2023

(54) SEMI-ACTIVE SYSTEM FOR PROVIDING A REQUIRED FLUID FLOW

(71) Applicant: Airbus Operations GmbH, Hamburg (DE)

(72) Inventors: Peter Kreuzer, Hamburg (DE); Hubert Stuke, Hamburg (DE); Udo Krause, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 532 days.

(21) Appl. No.: 16/175,256

(22) Filed: Oct. 30, 2018

(65) Prior Publication Data

US 2019/0161173 A1  May 30, 2019

(30) Foreign Application Priority Data

Nov. 30, 2017 (DE) ...................... 10 2017 128 386.2

(51) Int. Cl.
*B64C 21/04* (2006.01)
*B64C 21/02* (2006.01)
*F15D 1/00* (2006.01)
*B64C 1/00* (2006.01)

(52) U.S. Cl.
CPC ............ *B64C 21/04* (2013.01); *B64C 21/025* (2013.01); *B64C 1/0009* (2013.01); *B64C 2230/04* (2013.01); *F15D 1/0055* (2013.01)

(58) Field of Classification Search
CPC .............................. B64C 21/04; B64C 21/025
See application file for complete search history.

(56) References Cited

U.S. PATENT DOCUMENTS

| 1,810,693 A | * | 6/1931 | Alfaro | ..................... B64C 21/02 244/211 |
| 2,646,945 A | * | 7/1953 | Perry | ..................... B64C 21/025 244/204 |
| 3,604,661 A | * | 9/1971 | Mayer, Jr. | ............... B64C 21/04 244/207 |

(Continued)

FOREIGN PATENT DOCUMENTS

| EP | 3081482 A1 | 10/2016 |
| EP | 3192736 A1 | 7/2017 |

(Continued)

OTHER PUBLICATIONS

German Search Report; priority document.

*Primary Examiner* — Jessica B Wong
(74) *Attorney, Agent, or Firm* — Greer, Burns & Crain, Ltd.

(57) ABSTRACT

A semi-active system for providing a required fluid flow, the system comprising an outlet configured to protrude into the main flow direction of an external fluid flow external to the semi-active system, an exhaust channel provided, in relation to the main flow direction of the external fluid flow, beneath the outlet, the exhaust channel being configured to inject an exhaust fluid flow into the external fluid flow, a device configured to produce a jet fluid flow and a pipe provided within the exhaust channel, the pipe being configured to fluid-communicatively couple to the device, and entrain, by the produced jet fluid flow, the exhaust fluid flow.

15 Claims, 7 Drawing Sheets

(56) References Cited

U.S. PATENT DOCUMENTS

| | | | | |
|---|---|---|---|---|
| 3,921,942 A | * | 11/1975 | Bracka | B64C 9/16 244/87 |
| 9,108,725 B1 | * | 8/2015 | Shmilovich | B64C 21/04 |
| 2006/0060723 A1 | * | 3/2006 | Greenblatt | B64C 21/08 244/207 |
| 2009/0108125 A1 | * | 4/2009 | Shmilovich | B64C 21/04 244/15 |
| 2012/0001028 A1 | * | 1/2012 | Frey | B64C 21/06 244/208 |
| 2014/0312166 A1 | | 10/2014 | Zhu | |
| 2015/0008292 A1 | * | 1/2015 | Bernhardt | B64C 21/04 244/213 |
| 2016/0272301 A1 | * | 9/2016 | Shmilovich | B64C 21/04 |
| 2016/0375987 A1 | | 12/2016 | Shmilovich et al. | |
| 2017/0197706 A1 | | 7/2017 | Garcia Nieto et al. | |

FOREIGN PATENT DOCUMENTS

| | | | | |
|---|---|---|---|---|
| GB | 790298 | * | 2/1958 | |
| GB | 790298 A | * | 2/1958 | B64D 27/18 |

\* cited by examiner

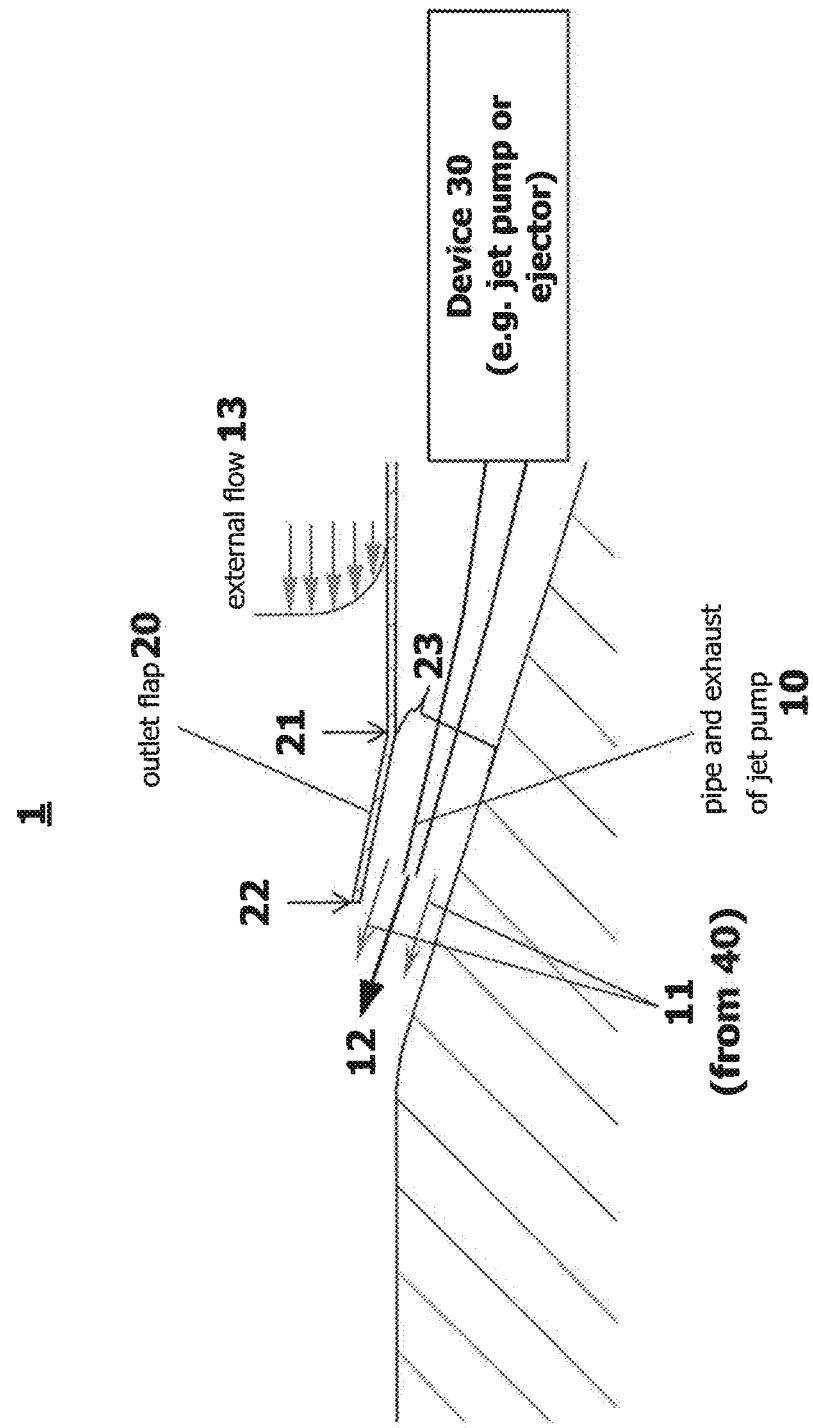

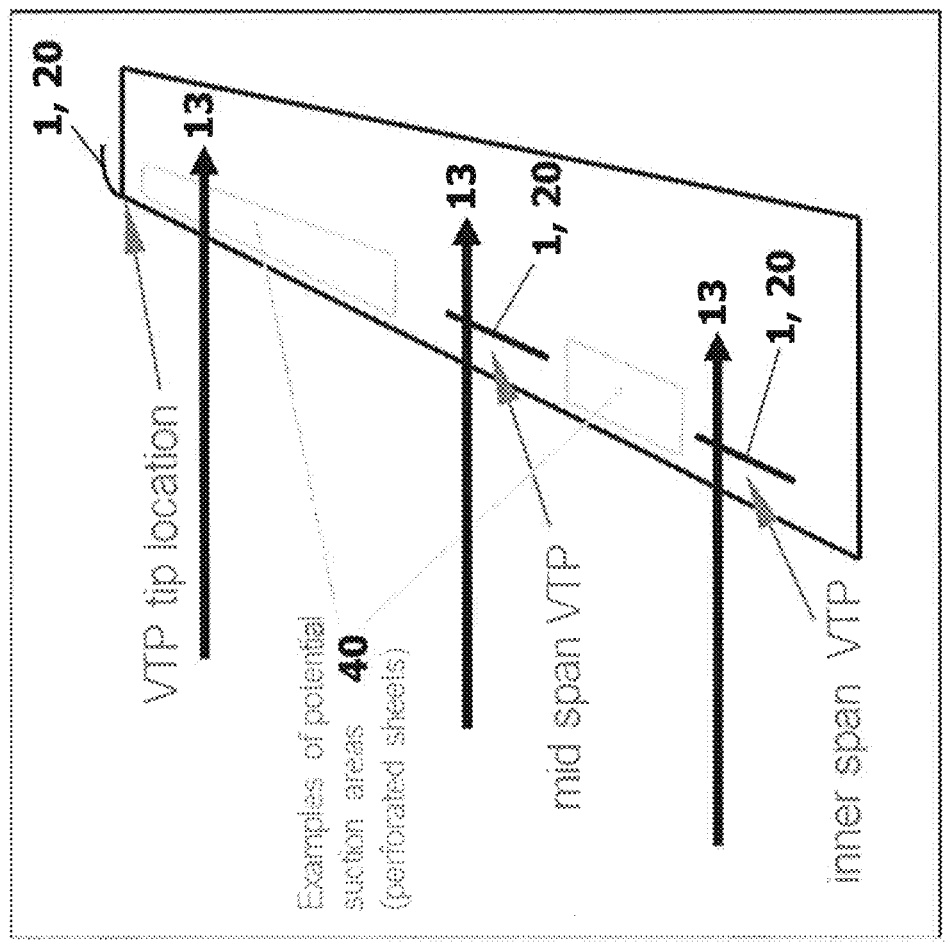

Fig. 2
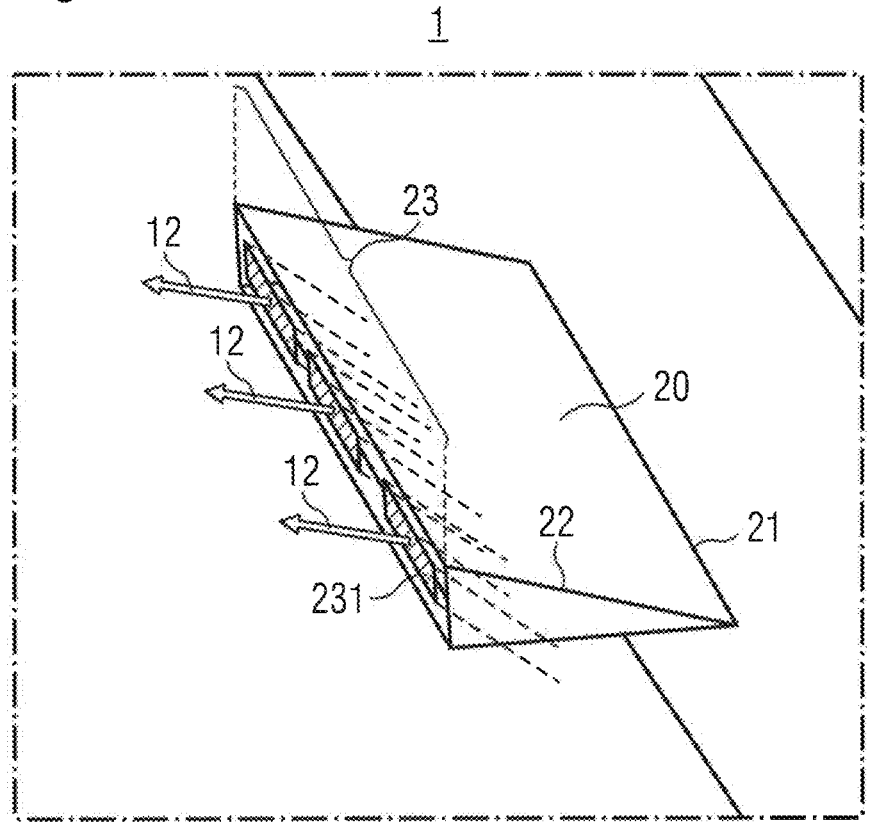
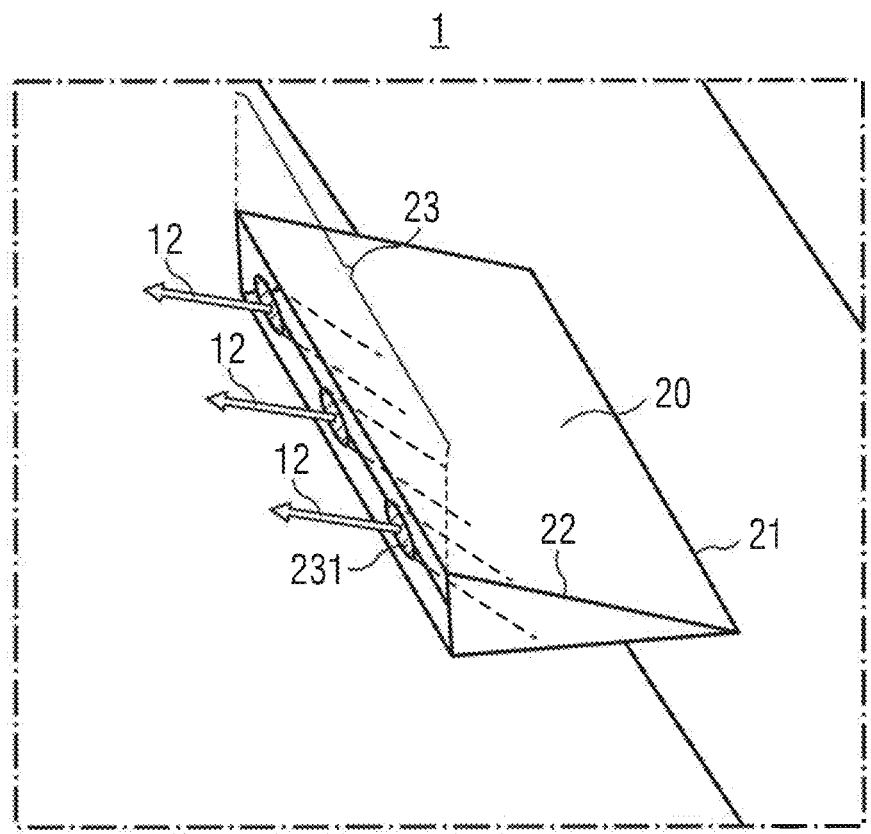

Fig. 4
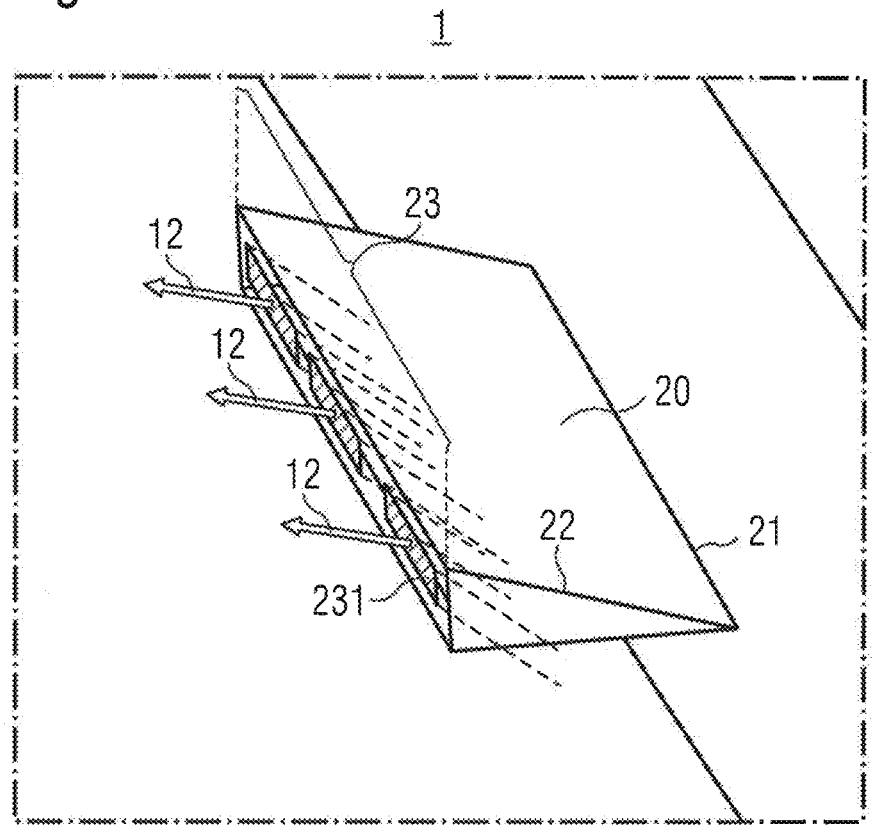
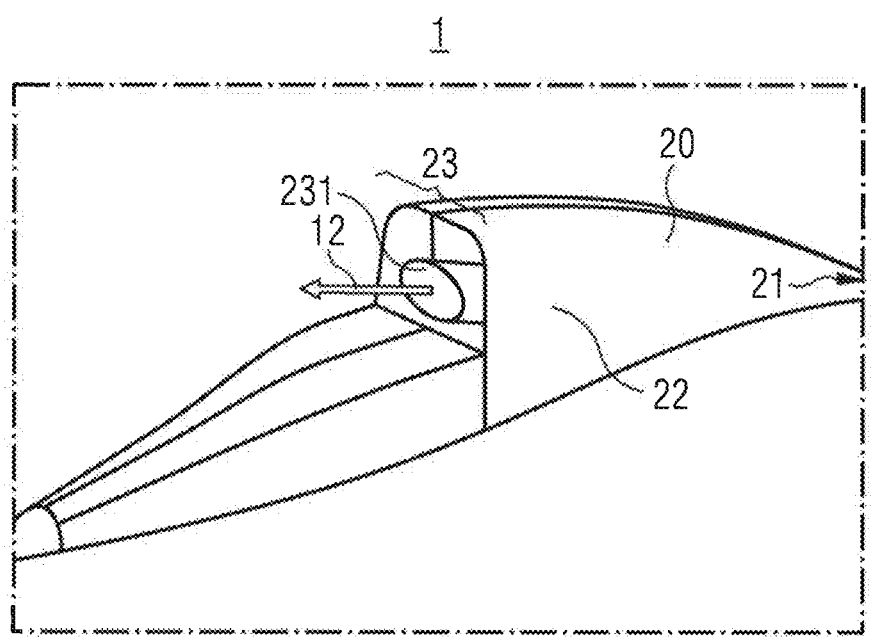

Fig. 5
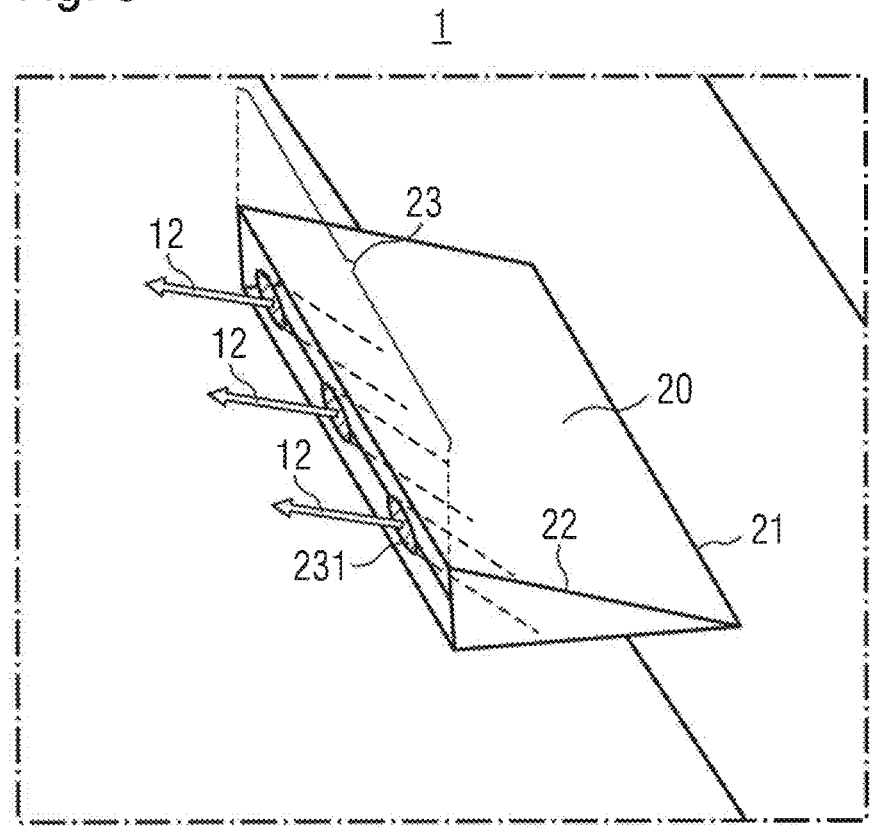
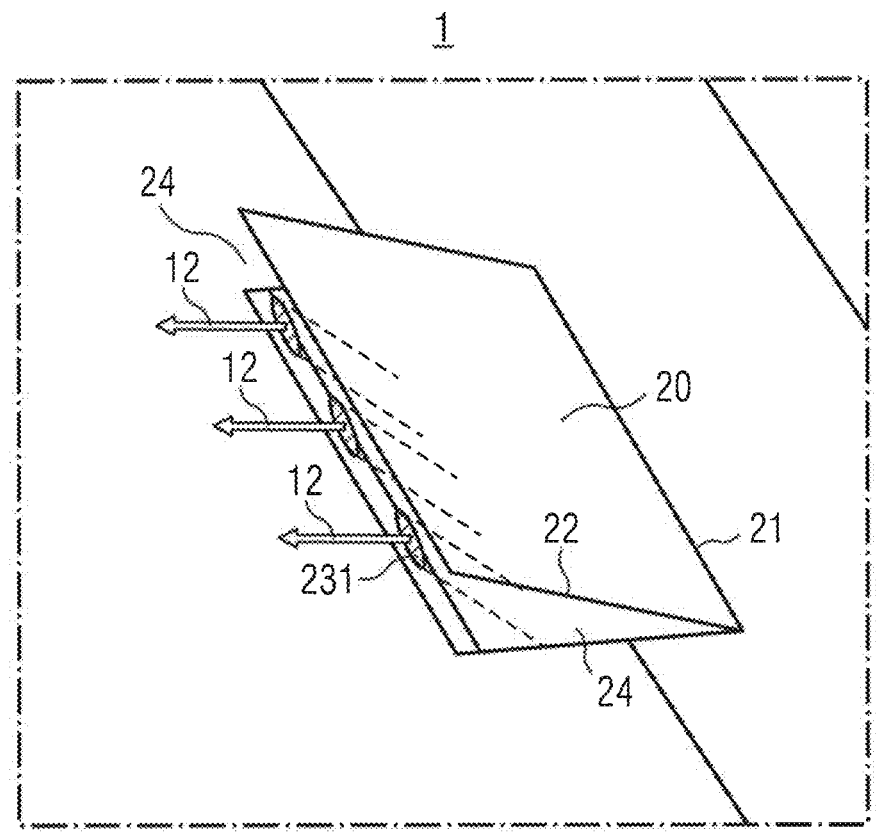

SEMI-ACTIVE SYSTEM FOR PROVIDING A REQUIRED FLUID FLOW

CROSS-REFERENCES TO RELATED APPLICATIONS

This application claims the benefit of the German patent application No. 10 2017 128 386.2 filed on Nov. 30, 2017, the entire disclosures of which are incorporated herein by way of reference.

TECHNICAL FIELD

The present disclosure generally relates to suction of fluids, e.g., within an aerodynamic context. In particular, the present disclosure relates to a semi-active system for providing a required fluid flow.

BACKGROUND

The present disclosure relates to suction of fluids, particularly in the context of Hybrid Laminar Flow Control (HLFC).

Problems arise when driving aerodynamic suction by passive means. Hence, a simple passive driven solution might not yield a required fluid flow.

The present inventors found out that an active system was not an option either, e.g., due to requirements on reliability, energy consumption, system complexity, etc. Rather, according the present inventors, a semi-active system is a fitting compromise in that application of a jet pump or ejector would help to drive fluid flow.

SUMMARY OF THE INVENTION

Accordingly, there is a need for an implementation of a scheme that avoids one or more of the problems discussed above, or other related problems.

The present disclosure aims at the following targets:

Application of a jet pump could support the flow drive and hence be an ideal solution for that system.

On a passively driven suction system, a compromise has to be found between the constraints of aerodynamic drag caused by the passive system vs. gained mass/fluid flow through the system.

In addition, the present disclosure enables the following advantages:

High economic benefit is to be expected though fuel saving by HLFC application. Such suction drive/air support through a jet pump has advantages in view of energy saving: the air drive through a conventional pump needs much more (electrical) energy than a system that is (partly) driven by a jet pump.

Smaller outlet design, and hence, less aerodynamic drag.

Higher mass/fluid flow through the outlet (compared to an outlet with the same size), and hence, higher performance of said outlet.

Low impact on HLFC performance when system fails (no need of redundancy: when jet pump system fails, HLFC performance may be reduced, but the HLFC benefit is not completely lost).

Lower system weight than in case of installation of an active system (since no redundancy is needed).

Lower energy need for jet pump system vs. an active system.

Recent application example is Hybrid Laminar Flow Control (HLFC) applied within project A350XWB VTP HLFC.

In a first aspect, there is provided a semi-active system for providing a required fluid flow, the system comprising an outlet configured to protrude into the main flow direction of an external fluid flow external to the semi-active system, an exhaust channel provided, in relation to the main flow direction of the external fluid flow, beneath the outlet, the exhaust channel being configured to inject an exhaust fluid flow into the external fluid flow, a device configured to produce a jet fluid flow and a pipe provided within the exhaust channel, the pipe being configured to fluid-communicatively couple to the device, and entrain, by the produced jet fluid flow, the exhaust fluid flow.

In a first refinement of the first aspect, the outlet may be a Hybrid Laminar Flow Control, HLFC, outlet. In addition or alternatively, the device may be one of a jet pump and an ejector.

In a second refinement of the first aspect, the outlet may further comprise an outlet flap having a lower end and a protruding end protruding into the external fluid flow, wherein the protruding end is downstream of the lower end in relation to the main flow direction of the external fluid flow. In that case, the outlet flap may have at least one of the following geometrical designs: circular, elliptical, rectangular, triangular, and rounded.

Further concerning the second refinement of the first aspect, the pipe may have one end connected to the device, and another open end disposed in the exhaust channel and beneath the outlet between the lower end and the protruding end. If so, the pipe may comprise, at its open end, at least one exhaust having an outflow area for the produced jet fluid flow. In the latter case, the outflow area of the exhaust has one of the following shapes: polygonal, rectangular, triangular, circular, semi-circular, ellipsoid, semi-ellipsoid, a parallelogram, and a chevron.

As an alternative pertaining to the second refinement of the first aspect, the outlet flap may have open portions along its sides substantially parallel to the main flow direction of the external fluid flow.

Further concerning the second refinement of the first aspect and the alternative, the outlet flap may have the following dimensions: a length of 230 mm, the length being defined in the direction parallel to the main flow direction of the external fluid flow, and a width of 300 mm or 600 mm, the width being defined in the direction perpendicular to the main flow direction of the external fluid flow.

In a third refinement of the first aspect, a source of the produced jet fluid flow may be one of a dedicated source and a by-product source. In the first-named case, the dedicated source may at least one of an active pump and pressure tank stored air. In addition or alternatively, in the latter-named case, the by-product source may be at least one of bleed air and exhaust cabin air.

In a second aspect, there is provided an aircraft, comprising the semi-active system of the first aspect, wherein the semi-active system is part of at least one of the following aircraft components: a wing, a belly fairing, a fuselage, a vertical tail plane, VTP, and a horizontal tail plane, HTP. If so, when the semi-active system is part of the VTP, the outlet may be positioned at one or more of the following locations: an inner-span VTP location, a mid-span VTP location, an outer VTP location, and a VTP tip location.

BRIEF DESCRIPTION OF THE DRAWINGS

The embodiments of the technique presented herein are described herein below with reference to the accompanying drawings, in which:

FIG. 1A shows a schematic drawing of a generic example arrangement of the apparatus according to the present disclosure;

FIG. 1B shows a schematic drawing showing suction areas and application locations of the apparatus.

FIG. 2 shows an overview of the apparatus according to a first embodiment of the present disclosure;

FIG. 4 shows an overview of the apparatus according to a first embodiment of the present disclosure related to a first use case;

FIG. 5 shows an overview of the apparatus according to a second embodiment of the present disclosure.

DETAILED DESCRIPTION OF THE PREFERRED EMBODIMENTS

Figure 3:
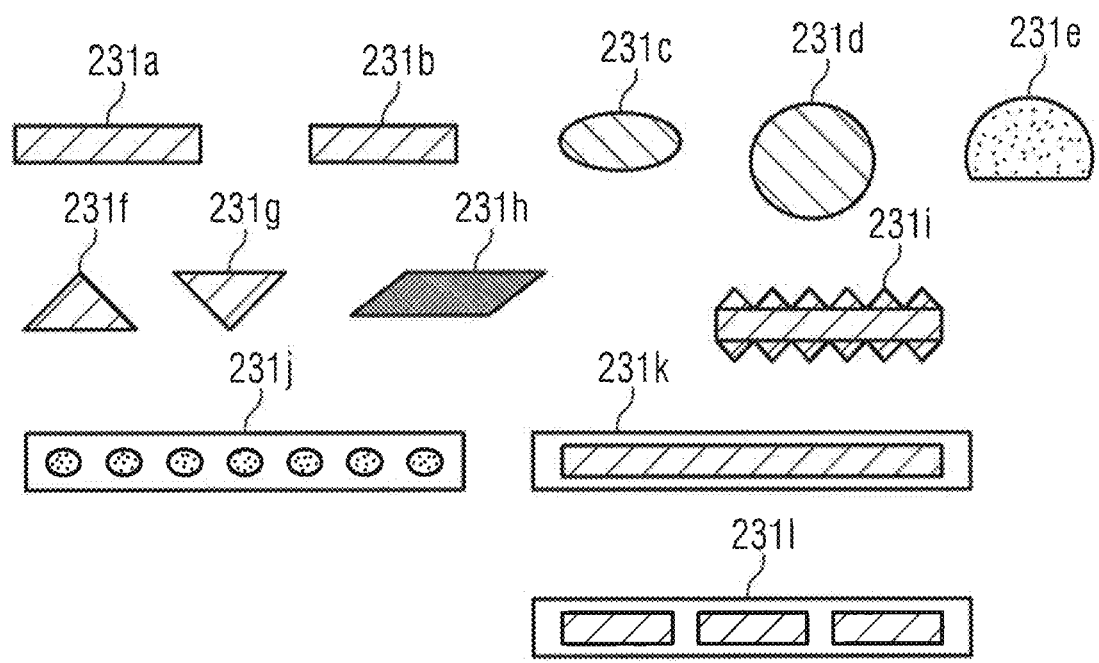
FIG. 3 shows the examples usable as the form/shape of the exhaust area of the exhaust.

In the following description, for purposes of explanation and not limitation, specific details are set forth in order to provide a thorough understanding of the technique presented herein. It will be apparent to one skilled in the art that the present technique may be practiced in other embodiments that depart from these specific details.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP) or general purpose computer. It will also be appreciated that while the following embodiments are described in the context of methods and devices, the technique presented herein may also be embodied in a computer program product as well as in a system comprising a computer processor and a memory coupled to the processor, wherein the memory is encoded with one or more programs that execute the services, functions and steps disclosed herein. This applies especially to an aspect of (adaptively) controlling the amount of jet fluid flow to be produced.

FIG. 1A shows a schematic drawing of a generic example arrangement of the apparatus according to the present disclosure. For example, the apparatus may be a jet pump working at HLFC an outlet.

FIG. 1A shows a semi-active system 1 for providing a required fluid flow. The system comprises an outlet 20 configured to protrude into the main flow direction of an external fluid flow 13 external to the semi-active system. The outlet may further comprise an outlet flap 20 having a lower end 21 and a protruding end 22 protruding into the external fluid flow, wherein the protruding end is downstream of the lower end in relation to the main flow direction of the external fluid flow 13.

The semi-active system 1 further comprises an exhaust channel 23 provided, in relation to the main flow direction of the external fluid flow 13, beneath the outlet 20. The exhaust channel 23 is further configured to inject an exhaust fluid flow 11 into the external fluid flow 13. As will be further detailed in relation to FIG. 1B, the exhaust fluid flow 11 preferably is supplied by a coupled suction area 40.

Furthermore, the outlet 20 may be an HLFC outlet. Accordingly, such a system 1 could be applied at any aircraft component where an HLFC outlet is usually installed (e.g., wing, belly fairing, fuselage, VTP and/or HTP).

The (semi-active) system further comprises a device 30 configured to produce a jet fluid flow 12. In this regard, there are different possible origins of a jet pump medium, i.e., the jet pump could be driven in multiple ways. For example, a source 30 of the produced jet fluid flow may be a dedicated source or a by-product source. The dedicated source may be, e.g., an active pump (which may be electrically driven) or pressure tank stored air. In this way, cost of the source of the jet fluid flow can be kept low.

Furthermore, the by-product source may be bleed air (e.g., from an engine of an aircraft) or exhaust cabin air. In this way, energy-conservative re-use can be made of exhaust air already present, e.g., in the aircraft.

That is, the device may be a jet pump or an ejector. In consideration of the exemplary HLFC application, e.g., at the VTP, any air outlet location (such as inner/mid/outer VTP location or VTP tip location) could be used in combination with the jet pump.

The system further comprises a pipe 10 provided within the exhaust channel 23, the pipe 10 being configured to fluid-communicatively couple to the device 30, and entrain, by the produced jet fluid flow 12, the exhaust fluid flow 11.

To sum up, without prejudice, the principle of jet pumps as such is already known. However, the application of a jet pump (or the support by a jet pump) to air suction through surfaces to provide a required fluid flow has not been considered before.

FIG. 1B shows a schematic drawing showing suction areas and application locations of the apparatus. It is a simplified sketch showing investigated VTP air outlet locations of passively driven HLFC.

As is shown in FIG. 1B, the (or each) semi-active system 1 may comprise (or may be augmented by) at least one (respective) suction area 40 (provided, e.g., on a wing of an aircraft; this does not rule out provision on other aircraft components). The main purpose of such suction area 40 is the provision of the exhaust fluid flow 11 (which is then to be entrained by the produced jet fluid flow 1. To this end, the suction area 40 may be fluid-communicatively coupled to the exhaust channel 23. Preferably, the at least one suction area 40 is provided offset from its coupled exhaust channel 23, meaning that at least one suction area 40 and its coupled exhaust channel 23 are not provided on the same axis being parallel to the main flow direction of the external fluid flow 13.

In FIG. 1B, the at least one suction area 40 may be provided at the leading edge of the wing (viewed in the main flow direction of the external fluid flow 1. This means that the at least one suction area 40 may be provided at 0% to 100% (i.e., the entire so-called chord length) viewed from the leading edge on the wing, preferably at 0% to 90% (each range being calculated between the leading edge and the trailing edge of the wing).

In particular, an aircraft is provided, which may comprise the semi-active system 1 described above, wherein the semi-active system 1 is part of at least one of the following aircraft components: a wing, a belly fairing, a fuselage, a vertical tail plane, VTP, and a horizontal tail plane, HTP.

Notably, also the at least one suction area 40 may be provided on at least one of the above aircraft components (the wing, as noted above, but also a belly fairing, a fuselage, a VTP and/or a HTP).

In particular, as shown in FIG. 1B, when the semi-active system is part of the VTP, the outlet may be positioned at one or more of the following locations: an inner-span VTP location, a mid-span VTP location, an outer VTP location and a VTP tip location.

FIG. 2 shows an overview of the apparatus according to a first embodiment of the present disclosure. For example, the apparatus may be a jet pump working at HLFC an outlet. In turn, FIG. 3 shows the examples usable as the form/shape of the exhaust area of the exhaust.

As shown in FIG. 2, the pipe 10 may have one end connected to the device 30, and another open end disposed in the exhaust channel 23 and beneath the outlet 20 between the lower end 21 and the protruding end 22. In this regard, the pipe 10 may comprise, at its open end, at least one exhaust 231 having an outflow area for the produced jet fluid flow 12. Here, the number of jet pump exhausts 231 per outlet could be any (from one to any number).

Concerning the location of the exhaust 231 in x-direction (i.e., defined in the longitudinal direction within the face of the outlet 20; this direction may be i) substantially perpendicular to the main flow direction of the external fluid flow 13 and ii) essentially parallel to the main plane of the surface on which the system 1 is located at), the person skilled in the art will be able to solve the optimization problem concerning the location, taking a maximum mass-flow benefit as optimality criterion.

Likewise, the size of the exhaust 231 can be made its own parameter or a further parameter of the above-defined optimization problem.

Furthermore, as shown in FIG. 3, the outflow area of the exhaust may have one of the following shapes: polygonal 231i, rectangular 231a, 231b, 231k, 231l, triangular 231f, 231g, circular 231d, semi-circular 231e, ellipsoid 231c, 231j, semi-ellipsoid, a parallelogram 231h and a chevron. That is, layout of the jet pump exhaust/exit 231 could be any geometrical design, whatever is possible (e.g., circle, elliptical, rectangular, triangular, rounded shape or any combination of these shapes). The contour of the exhaust 231 could also be chevron-like or something similar.

FIG. 4 shows an overview of the apparatus according to a first embodiment of the present disclosure related to a first use case. In this regard, the outlet flap 20 itself may have at least one of the following geometrical designs: circular, elliptical, rectangular, triangular and rounded.

That is, the system 1 may have any passively driven outlet design, such as a flap outlet (see left-hand portion of Fig. or a "rounded" outlet (see right-hand portion of Fig.

FIG. 5 shows an overview of the apparatus according to a second embodiment of the present disclosure.

The outlet flap may be closed, as shown in FIGS. 2, 4 and FIG. 5, left-hand portion. Alternatively, as shown in FIG. 5, right-hand portion, the outlet flap 20 may have open portions 24 along its sides substantially parallel to the main flow direction of the external fluid flow 13.

That is, application of the system at different designs of outlet flap 20 is possible. Hence, jet pump installation at any passively driven outlet with or without sidewalls is possible.

Figure 6:
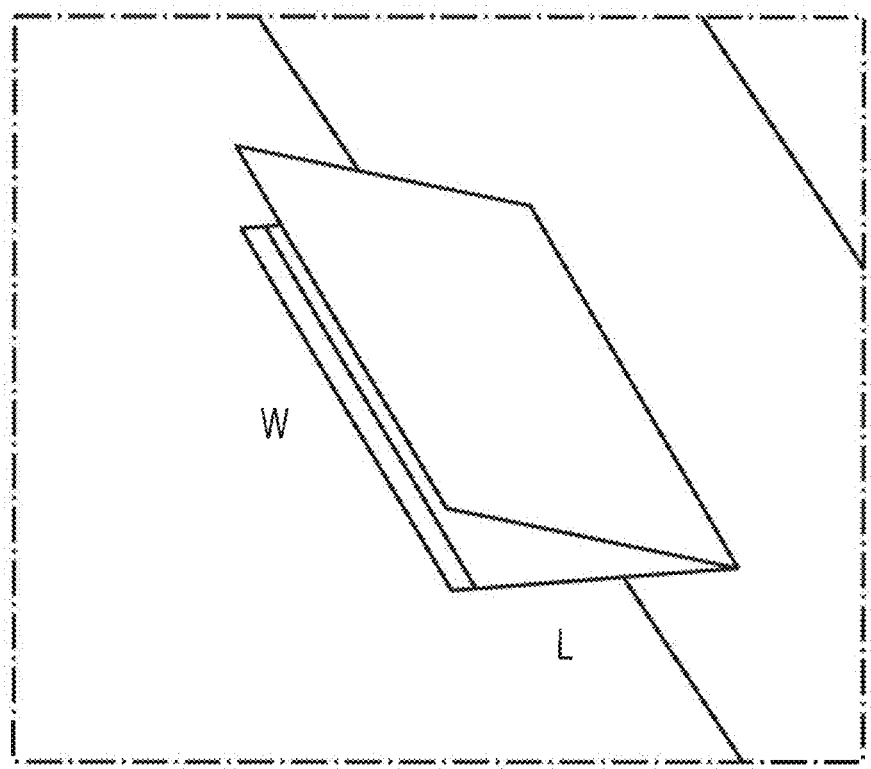
FIG. 6 shows the physical dimensions of the apparatus according to the first and second embodiments.

FIG. 6 shows the physical dimensions of the apparatus according to the first and second embodiments. That is, the outlet flap 20 may have the following dimensions: a length L of 230 mm, the length being defined in the direction parallel to the main flow direction of the external fluid flow 13, and a width W of 300 mm or 600 mm, the width being defined in the direction perpendicular to the main flow direction of the external fluid flow 13.

It is believed that the advantages of the technique presented herein will be fully understood from the foregoing description, and it will be apparent that various changes may be made in the form, constructions and arrangement of the exemplary aspects thereof without departing from the scope of the present disclosure or without sacrificing all of its advantageous effects. Because the technique presented herein can be varied in many ways, it will be recognized that the present disclosure should be limited only by the scope of the claims that follow.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A semi-active system for providing a required fluid flow, the system comprising:
   an outlet protruding from a surface into a main flow direction of an external fluid flow along the surface and external to the semi-active system;
   an exhaust channel provided, in relation to the main flow direction of the external fluid flow, beneath the outlet, the exhaust channel being configured to inject an exhaust fluid flow into the external fluid flow so that the exhaust fluid flows along the surface with the external fluid flow;
   a device configured to produce a jet fluid flow; and
   a pipe provided within the exhaust channel, the pipe being configured to:
      fluid-communicatively couple to the device, and
      entrain, by the produced jet fluid flow, the exhaust fluid flow,
   wherein the pipe comprises a first end connected to the device and a second, open end disposed within in the exhaust channel and below the outlet.

2. The semi-active system of claim 1, wherein the outlet is a Hybrid Laminar Flow Control outlet.

3. The semi-active system of claim 1, wherein the device is one of a jet pump and an ejector.

4. The semi-active system of claim 1, wherein the outlet further comprises an outlet flap having a lower end and a protruding end protruding into the external fluid flow, wherein the protruding end is downstream of the lower end in relation to the main flow direction of the external fluid flow.

5. The semi-active system of claim 4, wherein the outlet flap has at least one of the following geometrical designs:
   circular,
   elliptical,
   rectangular,
   triangular, and
   rounded.

6. The semi-active system of claim 4, wherein the second end to the pipe is between the lower end and the protruding end.

7. The semi-active system of claim 6, wherein the pipe comprises at its open end at least one exhaust having an outflow area for the produced jet fluid flow.

8. The semi-active system of claim 7, wherein the outflow area of the exhaust has one of the following shapes:
- polygonal,
- rectangular,
- triangular,
- circular,
- semi-circular,
- ellipsoid,
- semi-ellipsoid,
- a parallelogram, and
- a chevron.

9. The semi-active system of claim 4, wherein the outlet flap has open portions along its sides substantially parallel to the main flow direction of the external fluid flow.

10. The semi-active system of claim 4, wherein the outlet flap has the following dimensions:
- a length of 230 mm, the length being defined in the direction parallel to the main flow direction of the external fluid flow; and
- a width of 300 mm or 600 mm, the width being defined in the direction perpendicular to the main flow direction of the external fluid flow.

11. The semi-active system according to claim 1, wherein a source of the produced jet fluid flow is one of a dedicated source and a by-product source.

12. The semi-active system according to claim 11, wherein the dedicated source is at least one of:
- an active pump; and
- pressure tank stored air.

13. The semi-active system according to claim 11, wherein the by-product source is at least one of:
- bleed air; and
- exhaust cabin air.

14. An aircraft, comprising the semi-active system of any one of the preceding claims, wherein the semi-active system is part of at least one of the following aircraft components:
- a wing,
- a belly fairing,
- a fuselage,
- a vertical tail plane, and
- a horizontal tail plane.

15. The aircraft of claim 14, wherein, when the semi-active system is part of the vertical tail plane, the outlet is positioned at one of the following locations:
- an inner-span vertical tail plane location,
- a mid-span vertical tail plane location,
- an outer vertical tail plane location, and
- a vertical tail plane tip location.

* * * * *